United States Patent Office 2,933,468
Patented Apr. 19, 1960

2,933,468

EMULSIFIERS FROM HYDROCARBON POLYMER, MALEIC ANHYDRIDE, AND POLYALKYLENE OXIDE GLYCOL, EMULSION CONTAINING SAME AND METHODS FOR MAKING THEREOF

Clyde Lee Aldridge, Baker, and Elphege Maxime Charlet, Baton Rouge, La., assignors to Esso Research and Engineering Company, a corporation of Delaware No Drawing. Application January 26, 1956
Serial No. 561,681

9 Claims. (Cl. 260—29.7)

This invention relates to the preparation of non-ionic emulsifying agents and the emulsions prepared therefrom and more particularly relates to the preparation of non-ionic emulsifying agents from the hydrocarbon polymers to be emulsified.

In the preparation of emulsions and latices from hydrocarbon polymers it is often desirable to use non-ionic rather than either anionic or cationic emulsifiers. It is generally accepted that the most stable oil/water emulsions are formed by having present two emulsifying agents, one of which is an oil soluble water/oil emulsifer and the other a water soluble oil/water emulsifier. Since anionic and cationic emulsifiers are incompatible, it is necessary that one of the two emulsifiers be non-ionic. However, good non-ionic emulsifiers are not as plentiful as either the anionic or cationic emulsifiers. Furthermore, with certain types of polymers while it is easy to prepare a stable emulsion it is difficult to to obtain a latex which will cast smooth clear films.

It is therefore the major object of this invention to prepare an improved non-ionic emulsifier which may be used alone or in combination with an anionic or cationic emulsifier or even other non-ionic emulsifiers.

It is a further object of this invention to prepare a non-ionic emulsifier from a hydrocarbon polymer to be emulsified.

It is a still further object of this invention to prepare an emulsifier from a portion of a hydrocarbon to be emulsified and simultaneously emulsifying the remainder of the polymer.

It is still another object of this invention to prepare from a self-emulsified polymer a polymer latex which will cast clear smooth films.

These and other objects of this invention are accomplished by reacting an unsaturated polymer with maleic anhydride and then reacting the maleic anhydride-polymer adduct with a polyalkylene oxide glycol.

Hydrocarbons to which the present invention is applicable include the copolymer of 97% isobutylene and 3% isoprene made by low temperature Friedel-Crafts polymerization, known as Butyl rubber; petroleum resins prepared from steam-cracked petroleum streams boiling between 20° and 280° C.; by low temperature Friedel-Crafts polymerization; liquid and solid polybutadiene and liquid and solid copolymers of 75 to 85% butadiene and 15 to 25% styrene prepared by sodium polymerization. The preparation of the steam-cracked petroleum resins is described in copending application Ser. No. 295,836, filed June 26, 1952, now U.S. Patent No. 2,698,841 to which reference is made for further details of preparation and which subject matter is incorporated herein by reference. The preparation of the liquid copolymers of butadiene and styrene and of liquid polybutadiene are described in application Ser. No. 176,771, filed July 29, 1950, now U.S. Patent No. 2,762,851 and Ser. No. 440,859, filed July 1, 1954, respectively, to which reference is also made and which are likewise incorporated herein by reference.

According to the preferred method of carrying out the present invention, the hydrocarbon polymer is placed in an agitated reactor together with 0.1 to 20 weight percent, preferably 0.5 to 5 weight percent (based on said polymer), of maleic anhydride. A catalyst such as tertiary butyl hydroperoxide or ditertiary butyl peroxide may be used, if desired. The temperature is maintained between 50 and 250° C. until the desired amount of maleic anhydride has been incorporated in the polymer. After the maleic anhydride adduct has been formed, a polyalkylene oxide glycol, such as polyethylene oxide glycol or polypropylene oxide glycol, is added in amounts from 0.1 up to about one mole per one mole of available COOH or equivalent groups on the polymer adduct. The temperature is maintained between 175° and 250° C. until the reaction is complete.

While it is not desired to limit the invention by any theory of the reactions involved, it is believed that the following represents the course of the reactions:

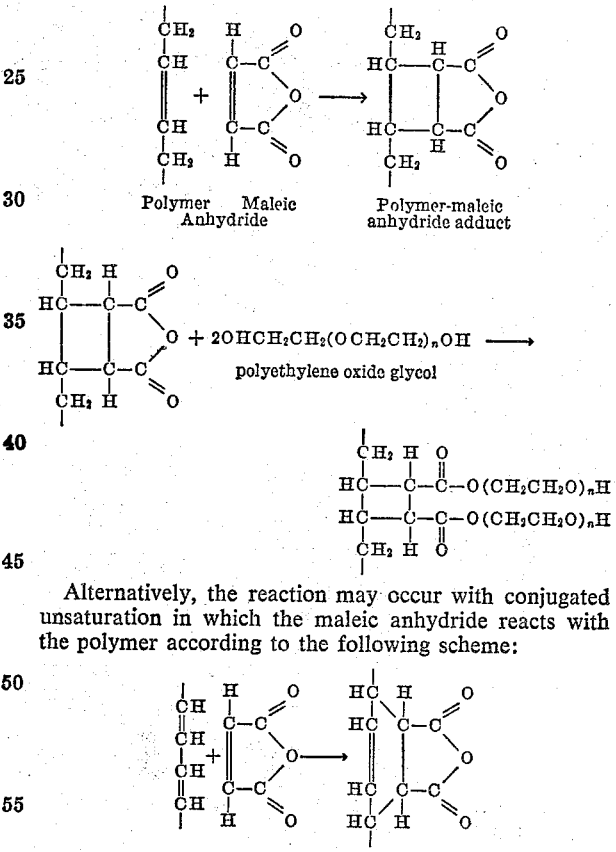

Alternatively, the reaction may occur with conjugated unsaturation in which the maleic anhydride reacts with the polymer according to the following scheme:

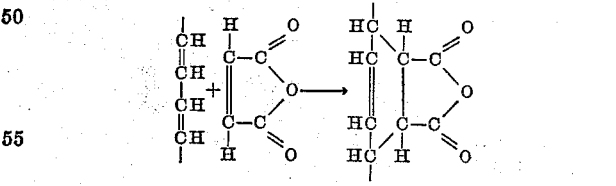

Thus in the first step the resin adds to the maleic anhydride to form the adduct. The adduct then reacts with the polyalkylene oxide glycol such that a maximum of one molecule of glycol adds to each carboxyl on the adduct. The number of alkylene oxide units may vary but should be more than 5 and not more than 25, preferably about 10–20, desirably about 15. When 15 units are used the molecule of the product is about equally distributed in molecular weight between the hydrocarbon portion and the ester portion of the molecule. Thus the hydrophobic or hydrocarbon portion of the molecule is about equal to the hydrophillic or ester portion so that the compound is both water soluble and hydrocarbon soluble.

The product obtained by the above procedure may be used to emulsify the same or a different polymer or even hydrocarbons such as hexane or other saturated hydrocarbons, either alone or in adjunct with another emulsifying agent.

In order to prepare from steam-cracked petroleum resins latices which are of the oil in water type, it is necessary to include a polyoxyethylated octyl phenol containing 8 to 10 ethylene oxide units as an additional emulsifier. The proportions by weight of the two emulsifiers may range from 1/2 to 2/1. The polymer-maleic anhydride polyalkylene oxide glycol when used alone is employed in proportions by weight of 1 to 10% based on the polymer. The same proportion of total emulsifier is used when two or more emulsifiers are used.

The following examples will serve to illustrate the mode of operation as well as the advantages of the present invention, although it will be understood that various other embodiments or modifications not specifically illustrated herein are possible without departing from the spirit or scope of the invention.

Example I

A steam-cracked hydrocarbon resin having a softening point of 93° C. was heated for 24 hours at 235° C. with 5% by weight of maleic anhydride in a glass fitted with a stirrer and a water-cooled reflux condenser. A slow stream of nitrogen was continuously passed through the reactor. A resin-anhydride adduct having a softening point of 107° C. was recovered.

Example II 100 grams of the resin-adduct of Example I was mixed with 60 grams of a polyethylene oxide glycol containing 15 ethylene oxide units. The mixture was heated 30 minutes at 200° C. and 30 minutes at 250° C. under nitrogen. The resulting product was a waxy solid which exhibited both water and hydrocarbon solubility. It also exhibited very high emulsifying power. Hexane and water were readily emulsified by mild shaking when using this agent in the amount of only 1 part of the agent to 100 parts of hexane.

Example III 1.5 grams of the reaction product of Example II was dissolved in 10 cc. hexane and added to 150 ml. of a 70% solution in hexane of the resin of Example I. This mixture was slowly added to 150 ml. of a 1.5% water solution of Triton X-100 (a polyoxyethylated octyl phenol containing 8-10 ethylene oxide units) which was being agitated at full speed in a Waring Blendor. After addition of the resin solution the total was mixed for three minutes at full speed. An oil-in-water type emulsion of excellent appearance and stability was produced. This emulsion showed no signs of breaking after two weeks standing. Films cast from this emulsion were of the transparent continuous type.

Example IV

An emulsion was prepared by adding 150 ml. of a 70% solution in hexane of a steam-cracked hydrocarbon resin having a softening point of 93° C. slowly to 150 ml. of a water solution containing 0.82 gram of sodium lauryl sulfate and 8.2 grams of Triton X-100. An oil-in-water type emulsion was formed which cast an opaque powdery type of film.

Example V 100 grams of the resin adduct of Example I was mixed with 20 g. of a polyethylene oxide glycol containing 5 ethylene oxide units. The mixture was heated 30 minutes at 200° C. and 30 minutes at 240-250° C. The product was a hydrocarbon soluble solid.

Example VI 1.5 grams of the reaction product of Example V was dissolved in 10 cc. of hexane and added to 150 ml. of a 70% solution in hexane of the resin of Example I. This mixture was slowly added to 150 ml. of a 1.5% water solution of Triton X-100 which was being agitated at full speed in a Waring Blendor. After addition of the resin solution, the total was mixed for 3 minutes at full speed. An oil-in-water type emulsion was produced. After standing overnight 13% of the oil phase had coagulated.

Example VII

Example IV was repeated using Triton X-100 alone as the emulsifier. An oil-in-water emulsion was formed. However, after standing overnight about 13% had coagulated.

The above examples show that the novel product of this invention is an excellent emulsifier. However, it is also desirable to have present a polyoxyethylated octyl phenol containing 8-10 ethylene oxide units as an auxiliary emulsifier in order to obtain oil-in-water emulsions. When the emulsifier of the present invention is absent, powdery films are obtained. Furthermore, the polyethylene oxide glycol must contain more than five ethylene oxide units.

The nature of the present invention having been thus fully set forth and specific examples of the same given, what is claimed as new and useful and desired to be secured by Letters Patent is:

1. A process for preparing an emulsifying agent which comprises reacting an unsaturated hydrocarbon polymer, prepared by the Friedel-Crafts polymerization of a steam cracked petroleum stream boiling between about 20° and 280° C., with 0.1 to 20 weight percent, based on said polymer, of maleic anhydride at a temperature between 50° and 250° C.; then reacting the resulting adduct with a polyalkylene oxide glycol containing more than 5 and no more than 25 alkylene oxide units of 2 to 3 carbon atoms per unit at a temperature between 175° and 250° C., said glycol being added in ratio of 0.1 to 1.0 mole per acid equivalent of said adduct.

2. Process according to claim 1 in which the glycol is a polyethylene oxide glycol containing 15 ethylene oxide units.

3. A non-ionic emulsifier consisting essentially of the reaction product of (1) the adduct of an unsaturated hydrocarbon polymer, prepared by the Friedel-Crafts polymerization of a petroleum stream boiling between about 20° and 280° C., and 0.1 to 20 weight percent, based on said polymer, of maleic anhydride, and (2) 0.1 to 1.0 mole, per acid equivalent of said adduct, of a polyalkylene oxide glycol containing more than 5 and no more than 25 alkylene oxide units of 2 to 3 carbon atoms per unit.

4. Composition according to claim 3 in which the glycol is a polyethylene oxide glycol containing 15 ethylene oxide units.

5. An emulsification process which comprises agitating a homogeneous solution of a hydrocarbon polymer in a hydrocarbon solvent with water in the presence of a mixture of emulsifiers including a polyoxyethylated octyl phenol containing 8 to 10 ethylene oxide units and the emulsifier comprising the reaction product of (1) the adduct of an unsaturated hydrocarbon polymer, prepared by the Friedel-Crafts polymerization of a petroleum stream boiling between 20° and 280° C., and 0.1 to 20 weight percent, based on said polymer, of maleic anhydride, and (2) 0.1 to 1.0 mole, per acid equivalent of said adduct, of a polyalkylene oxide glycol containing more than 5 and no more than 25 alkylene oxide units of 2 to 3 carbon atoms per unit; to form an oil-in-water emulsion wherein the proportions by weight of the emulsifiers in the aforesaid mixture of emulsifiers is in the range of 2:1 to 1:2.

6. Process according to claim 5 in which the hydrocarbon polymer being emulsified is a steam-cracked petroleum resin.

7. Process according to claim 5 in which the glycol is a polyethylene oxide glycol containing about 15 ethylene oxide units.

8. A process for preparing a latex capable of casting clear, smooth films which comprises reacting a steam-cracked Friedel-Crafts polymerized, unsaturated, solid hydrocarbon petroleum resin prepared from steam cracked petroleum streams boiling between 20° and 280° C. with 0.5 to 5 weight percent, based on said resin, of maleic anhydride; heating the resulting polymer adduct at a temperature between about 175° and 250° C. with about 0.1 to 1.0 mole, per acid equivalent of said adduct, of a polyalkylene oxide glycol, containing 2 to 3 carbon atoms per alkylene oxide unit and having more than 5 and no more than 25 alkylene oxide units, thereby forming a polymeric emulsifier; dissolving said polymeric emulsifier in hexane; mixing the resulting hexane solution with a second hexane solution containing another portion of the first mentioned steam-cracked hydrocarbon resin; and adding the mixture of solutions to a water solution containing a polyoxyethylated octyl phenol emulsifier having 8 to 10 ethylene oxide units, the ratio by weight of polymeric emulsifier to phenol emulsifier being between about 1/2 and 2/1, and the ratio by weight of emulsifiers to unmodified steam-cracked hydrocarbon resin being between 1 and 10%.

9. Process according to claim 8 in which the glycol is a polyethylene oxide glycol containing 15 ethylene oxide units.

References Cited in the file of this patent

UNITED STATES PATENTS

| | | |
|---|---|---|
| 2,118,925 | Humphrey | May 31, 1938 |
| 2,155,639 | Bradley | Apr. 25, 1939 |
| 2,208,321 | Bradley | July 16, 1940 |
| 2,230,005 | Moser | Jan. 28, 1941 |
| 2,467,958 | Block | Apr. 19, 1949 |
| 2,535,606 | Smith | Dec. 26, 1950 |
| 2,634,256 | Sparks | Apr. 7, 1953 |
| 2,700,026 | Dibert | Jan. 18, 1955 |
| 2,721,145 | Cheronis | Oct. 18, 1955 |
| 2,762,851 | Gleason | Sept. 11, 1956 |
| 2,778,740 | Armstrong | Jan. 22, 1957 |